United States Patent
Masui et al.

(10) Patent No.: US 10,780,884 B2
(45) Date of Patent: Sep. 22, 2020

(54) VEHICLE CRUISE CONTROL APPARATUS AND VEHICLE CRUISE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Toyoharu Katsukura, Kariya (JP); Yoshihisa Ogata, Kariya (JP); Takeshi Nanami, Toyota (JP); Takashi Nishida, Toyota (JP)

(73) Assignees: DENSO CORPORATION, Kariya, Aichi-Pref (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 120 days.

(21) Appl. No.: 15/529,953

(22) PCT Filed: Nov. 16, 2015

(86) PCT No.: PCT/JP2015/082150
§ 371 (c)(1),
(2) Date: May 25, 2017

(87) PCT Pub. No.: WO2016/084645
PCT Pub. Date: Jun. 2, 2016

(65) Prior Publication Data
US 2017/0327118 A1 Nov. 16, 2017

(30) Foreign Application Priority Data
Nov. 28, 2014 (JP) .................................. 2014-242236

(51) Int. Cl.
*B60W 30/165* (2020.01)
*B60W 30/10* (2006.01)
(Continued)

(52) U.S. Cl.
CPC .......... *B60W 30/165* (2013.01); *B60W 30/10* (2013.01); *B60W 30/143* (2013.01);
(Continued)

(58) Field of Classification Search
None
See application file for complete search history.

(56) References Cited

U.S. PATENT DOCUMENTS 4,786,164 A * 11/1988 Kawata ................. G01S 13/931
180/168
5,648,905 A * 7/1997 Izumi ....................... G08G 1/22
180/169

(Continued)

FOREIGN PATENT DOCUMENTS

EP 1684142 7/2006
JP H06-282798 10/1994
(Continued)

OTHER PUBLICATIONS

English Translation of Suzuki WO 2012/104918 (Year: 2019).*

*Primary Examiner* — Nicholas K Wiltey
(74) *Attorney, Agent, or Firm* — Maschoff Brennan (57) ABSTRACT

A cruise control apparatus controls the traveling of an own vehicle on the basis of the predicted route which is a predicted value of the travel route of an own vehicle. The cruise control apparatus compares the moving locus of the preceding vehicle with the position of a stationary object provided along the road to determine whether or not a moving locus is along the shape of the road. The moving locus is validated when it is determined that the moving (Continued)

locus is along the shape of the road, and the moving locus is invalidated when it is determined that the moving locus is not along the shape of the road, and the predicted route of the vehicle is calculated on the basis of the validated moving locus.

5 Claims, 7 Drawing Sheets

(51) Int. Cl.

| | |
|---|---|
| *G08G 1/16* | (2006.01) |
| *B60W 30/14* | (2006.01) |
| *B60W 40/04* | (2006.01) |
| *B60W 40/072* | (2012.01) |
| *B60W 40/105* | (2012.01) |
| *B60W 50/00* | (2006.01) |
| *G05D 1/02* | (2020.01) |

(52) U.S. Cl.
CPC .......... *B60W 40/04* (2013.01); *B60W 40/072* (2013.01); *B60W 40/105* (2013.01); *B60W 50/0097* (2013.01); *G05D 1/0223* (2013.01); *G05D 1/0246* (2013.01); *G05D 1/0257* (2013.01); *G08G 1/167* (2013.01); *B60W 2420/42* (2013.01); *B60W 2420/52* (2013.01); *B60W 2520/10* (2013.01); *B60W 2552/30* (2020.02); *B60W 2554/4041* (2020.02); *B60W 2554/804* (2020.02); *B60W 2720/10* (2013.01); *G05D 2201/0213* (2013.01)

(56) References Cited

U.S. PATENT DOCUMENTS

| | | | | |
|---|---|---|---|---|
| 5,745,870 | A * | 4/1998 | Yamamoto | G01S 13/931 340/435 |
| 5,848,364 | A * | 12/1998 | Ohashi | G01C 21/3632 701/26 |
| 6,094,616 | A | 7/2000 | Andreas et al. | |
| 6,721,645 | B2 * | 4/2004 | Lueder | B60K 31/0008 701/93 |
| 6,853,906 | B1 * | 2/2005 | Michi | B60K 31/0008 701/410 |
| 7,135,961 | B1 * | 11/2006 | Operowsky | G01C 21/3629 340/425.5 |
| 7,684,921 | B2 * | 3/2010 | Kojima | B60K 31/0058 180/167 |
| 8,977,464 | B1 * | 3/2015 | Takahashi | B60W 30/025 701/70 |
| 9,959,754 | B1 * | 5/2018 | King | G08G 1/095 |
| 10,099,691 | B2 * | 10/2018 | Niino | B60W 30/16 |
| 2001/0037165 | A1 * | 11/2001 | Shirai | B60W 30/16 701/1 |
| 2003/0225519 | A1 * | 12/2003 | Miyahara | B60K 31/0008 701/301 |
| 2004/0098196 | A1 * | 5/2004 | Sekiguchi | B60K 31/0008 701/301 |
| 2004/0143416 | A1 * | 7/2004 | Hattori | B60K 31/0066 702/157 |
| 2005/0102095 | A1 * | 5/2005 | Vanegas | G01C 21/3632 701/437 |
| 2005/0243301 | A1 * | 11/2005 | Takagi | B60W 40/02 356/4.07 |
| 2006/0148615 | A1 * | 7/2006 | Steen | B60W 10/06 477/111 |
| 2006/0217882 | A1 * | 9/2006 | Takashima | G01C 21/3632 701/457 |
| 2007/0055444 | A1 * | 3/2007 | Mikame | G01C 21/3632 701/411 |
| 2007/0100544 | A1 * | 5/2007 | Sugiura | G01C 21/005 701/431 |
| 2007/0182529 | A1 * | 8/2007 | Dobler | B60K 28/06 340/438 |
| 2007/0276596 | A1 * | 11/2007 | Solomon | G01C 21/3632 701/431 |
| 2008/0086269 | A1 * | 4/2008 | Joe | B60W 30/09 701/301 |
| 2009/0037094 | A1 * | 2/2009 | Schmidt | G01C 21/3632 701/533 |
| 2009/0052983 | A1 * | 2/2009 | Goj | E01C 1/04 404/1 |
| 2009/0319148 | A1 * | 12/2009 | Kubo | B60T 7/22 701/96 |
| 2010/0198488 | A1 * | 8/2010 | Groitzsch | G01C 21/26 701/117 |
| 2010/0204912 | A1 * | 8/2010 | Ros | G01C 21/32 701/532 |
| 2011/0071801 | A1 * | 3/2011 | Carrasco | G06F 17/5004 703/1 |
| 2011/0098922 | A1 * | 4/2011 | Ibrahim | B60W 40/08 701/532 |
| 2011/0155492 | A1 * | 6/2011 | Matsuda | B60K 13/02 180/68.3 |
| 2011/0178689 | A1 * | 7/2011 | Yasui | B60T 7/12 701/70 |
| 2012/0197525 | A1 * | 8/2012 | Noro | G01C 21/3626 701/437 |
| 2012/0239269 | A1 * | 9/2012 | Bonne | G08G 1/16 701/96 |
| 2013/0060462 | A1 * | 3/2013 | Hansen | G01C 21/3476 701/424 |
| 2013/0080019 | A1 * | 3/2013 | Isaji | B60W 30/16 701/96 |
| 2013/0282273 | A1 * | 10/2013 | Tanaka | G01C 21/34 701/428 |
| 2014/0028487 | A1 * | 1/2014 | Ishimori | G01S 13/06 342/70 |
| 2014/0142822 | A1 * | 5/2014 | Li | F16H 61/00 701/55 |
| 2014/0159886 | A1 * | 6/2014 | Hasegawa | B60K 35/00 340/435 |
| 2014/0169630 | A1 * | 6/2014 | Fukata | G08G 1/167 382/103 |
| 2014/0373810 | A1 * | 12/2014 | Grob | F02D 41/0087 123/349 |
| 2015/0088382 | A1 * | 3/2015 | Obuchi | B60K 31/00 701/41 |
| 2015/0100217 | A1 * | 4/2015 | Sudou | B60W 30/16 701/96 |
| 2015/0149045 | A1 * | 5/2015 | Mizuno | B60Q 1/1423 701/49 |
| 2015/0193562 | A1 * | 7/2015 | Chan | E01C 1/02 703/1 |
| 2015/0251586 | A1 * | 9/2015 | Imaeda | B60Q 1/12 362/466 |
| 2015/0307100 | A1 * | 10/2015 | Shimizu | B60T 7/22 701/96 |
| 2015/0322868 | A1 * | 11/2015 | Marenco | B60K 26/04 701/93 |
| 2015/0329108 | A1 * | 11/2015 | Kodaira | B62D 15/025 701/41 |
| 2015/0375744 | A1 * | 12/2015 | Kato | B60W 30/16 701/96 |
| 2016/0137060 | A1 * | 5/2016 | Brandin | B60K 31/0083 701/93 |
| 2016/0251014 | A1 * | 9/2016 | Tomiyama | B60W 30/143 701/96 |
| 2016/0325757 | A1 * | 11/2016 | Westlund | B60W 50/082 |
| 2016/0347181 | A1 * | 12/2016 | Yamakado | B60L 3/0015 |
| 2017/0015319 | A1 * | 1/2017 | Knoller | B60W 30/146 |
| 2017/0038941 | A1 * | 2/2017 | Pylappan | G06F 3/04815 |
| 2017/0120910 | A1 * | 5/2017 | Schubert | B60W 30/143 |
| 2017/0307754 | A1 * | 10/2017 | Skibinski | G01C 21/32 |
| 2017/0327118 | A1 * | 11/2017 | Masui | B60W 30/10 |
| 2018/0029639 | A1 * | 2/2018 | Taniguchi | B60R 16/0231 |

(56) References Cited

U.S. PATENT DOCUMENTS

| | | | |
|---|---|---|---|
| 2018/0144637 A1* | 5/2018 | Ikedo | G08G 1/056 |
| 2018/0257648 A1* | 9/2018 | Katoh | B60W 40/105 |
| 2018/0284264 A1* | 10/2018 | Chambers | G08G 1/163 |

FOREIGN PATENT DOCUMENTS

| | | |
|---|---|---|
| JP | H06-282798 A | 10/1994 |
| JP | H10-307998 | 11/1998 |
| JP | H10-307998 A | 11/1998 |
| JP | 2002-531886 A | 9/2002 |
| JP | 2005-140749 | 6/2005 |
| JP | 2005-140749 A | 6/2005 |
| WO | 2012/104918 A1 | 8/2012 |
| WO | WO 2012/104918 | 8/2012 |

\* cited by examiner

VEHICLE CRUISE CONTROL APPARATUS AND VEHICLE CRUISE CONTROL METHOD

CROSS-REFERENCE TO RELATED APPLICATION

This application is based on and claims the benefit of priority from earlier Japanese Patent Application No. 2014-242236 filed on Nov. 28, 2014 the descriptions of which is incorporated herein by reference.

TECHNICAL FIELD

The present disclosure relates to a vehicle cruise control, and specifically relates to cruise control technology for controlling the travelling of an own vehicle on the basis of a predicted route of the own vehicle.

BACKGROUND ART

A vehicle-following control in which an own vehicle travels following a preceding vehicle traveling in the same lane as the own vehicle among the preceding vehicles traveling in front of the own vehicle is known as an example of a vehicle traveling support control. It is important that such a vehicle-following control accurately selects the vehicle traveling in the same lane as the own vehicle among the preceding vehicles detected by a sensor, a camera, and the like. Therefore, calculating a future travel route of the own vehicle, and setting the preceding vehicle present on the future travel route as the target of the vehicle-following control has been performed conventionally. Further, various methods for calculating the future travel route of the own vehicle have been proposed (for example, refer to PTL 1). PTL 1 discloses that a traveling locus of the preceding vehicle traveling in front of the own vehicle is stored, and the stored traveling locus is used to calculate the future travel route of the own vehicle.

CITATION LIST

Patent Literature

[PTL 1] JP 2002-531886 T

SUMMARY OF THE INVENTION

Technical Problem

The aforementioned PTL 1 does not consider the case when a vehicle strays from the track such as the case when the preceding vehicle makes an unexpected lane change, thus, when such a situation occurs, there was the risk that the calculation accuracy of the route prediction of the own vehicle could decrease. Further, the moving locus of the preceding vehicle can only be obtained by the inter-vehicular section from the own vehicle to the preceding vehicle, thus, there is concern that the prediction of the future travel route is over a limited range.

An object of the present disclosure is to provide a vehicle cruise control technology which can increase the prediction accuracy for the travel route of an own vehicle.

Solution to Problem

The present disclosure utilizes the following means.

The present disclosure relates to a vehicle cruise control apparatus for controlling the traveling of an own vehicle on the basis of the predicted route which is the future travel route of the own vehicle. The cruise control apparatus of the present disclosure includes an object detection means for detecting the position of a stationary object provided on the road or along the road on the side of the road on which the own vehicle travels, a position storage means for storing in a time series the preceding vehicle position which is the position of the preceding vehicle traveling in front of an own vehicle, a moving locus of an other vehicle which is the trajectory of the preceding vehicle position stored in the position storage means, a trajectory determination means for determining whether or not the moving locus of the other vehicle is along the shape of the road by comparing with the position of a stationary object detected by the object detection means, and a course calculation means which validates the moving locus of the other vehicle when the trajectory determination means determines that the moving locus of the other vehicle is along the shape of the road, invalidates the moving locus of the other vehicle when it is determined that the moving locus of the other vehicle is not along the shape of the road, and calculates the predicted route on the basis of the validated moving locus of the other vehicle.

When using the moving locus of the preceding vehicle to perform the route prediction of the own vehicle, there are concerns that the calculation accuracy of the route prediction of the own vehicle is reduced, if using data when the preceding vehicle makes an unexpected lane change, etc., or of the movement which does not correspond to the shape of the road. With respect to this point, the cruise control apparatus of the present disclosure is constituted to determine whether or not the moving locus of the preceding vehicle is along the shape of the road by comparing the section lines of the traveling road and the position of a stationary object such as a guardrail and the like on the side of the road with the moving locus of the preceding vehicle. Further, when it is determined that the moving locus of the preceding vehicle is along the shape of the road, the moving locus of the preceding vehicle is validated. However, when it is determined that the moving locus of the preceding vehicle is not along the shape of the road, the moving locus of the preceding vehicle is invalidated. Moreover, the cruise control apparatus of the present disclosure is constituted so that the predicted route of the vehicle is calculated on the basis of the validated moving locus of the preceding vehicle. The cruise control apparatus of the present disclosure invalidates the moving locus of the preceding vehicle, when the preceding vehicle unexpectedly makes a movement which does not correspond to the road, and can suppress the predicted route of the vehicle from being erroneously calculated.

Further, the cruise control apparatus of the present disclosure is a vehicle cruise control apparatus for controlling the traveling of the own vehicle on the basis of the predicted route which is the future travel route of the own vehicle, and includes a position storage means for storing, in a time series, the preceding vehicle position which is of the preceding vehicle traveling in front of the own vehicle, a radius estimating means for estimating the curve radius of the traveling road of the own vehicle, and a course calculation means for calculating the predicted route for the inter-vehicular section from the own vehicle to the preceding vehicle on the basis of the moving locus of the other vehicle which is the trajectory of the preceding vehicle position stored in the position storage means, and calculating the predicted route for a section which is further away than the inter-vehicular section by extending the predicted route calculated based on the moving locus of the other vehicle on the basis of the curve radius estimated by the radius estimating means.

The moving locus of the preceding vehicle is only obtained by the inter-vehicular section from the own vehicle to the preceding vehicle, thus, the course sought based on the moving locus is limited to the inter-vehicular section. It is thought that the cruise control in this case decreases the controllability by limiting the vehicle which is the target for the cruise control based on the route prediction. Taking this point into consideration, the cruise control apparatus of the present disclosure extends the predicted route using the estimated curve radius so that the travel route further from the own vehicle can be predicted, and a course of the own vehicle to the other vehicle which is located further can be predicted. The cruise control apparatus of the present disclosure can enlarge the selected range of the vehicle which is the target for the cruise control based on the route prediction, and is suitable for executing cruise control based on the based on the route prediction thereby.

DESCRIPTION OF THE EMBODIMENTS

Below, an embodiment specifying the vehicle cruise control apparatus will be explained with reference to the drawings. The cruise control apparatus according to the present embodiment is mounted on a vehicle, and executes a vehicle-following control for traveling following the preceding vehicle traveling in the same lane as the own vehicle among the preceding vehicles traveling in front of the own vehicle. The vehicle-following control controls the distance between the own vehicle and the preceding vehicle. First, the schematic configuration of the cruise control apparatus of the present embodiment will be explained using FIG. 1.

Figure 1:
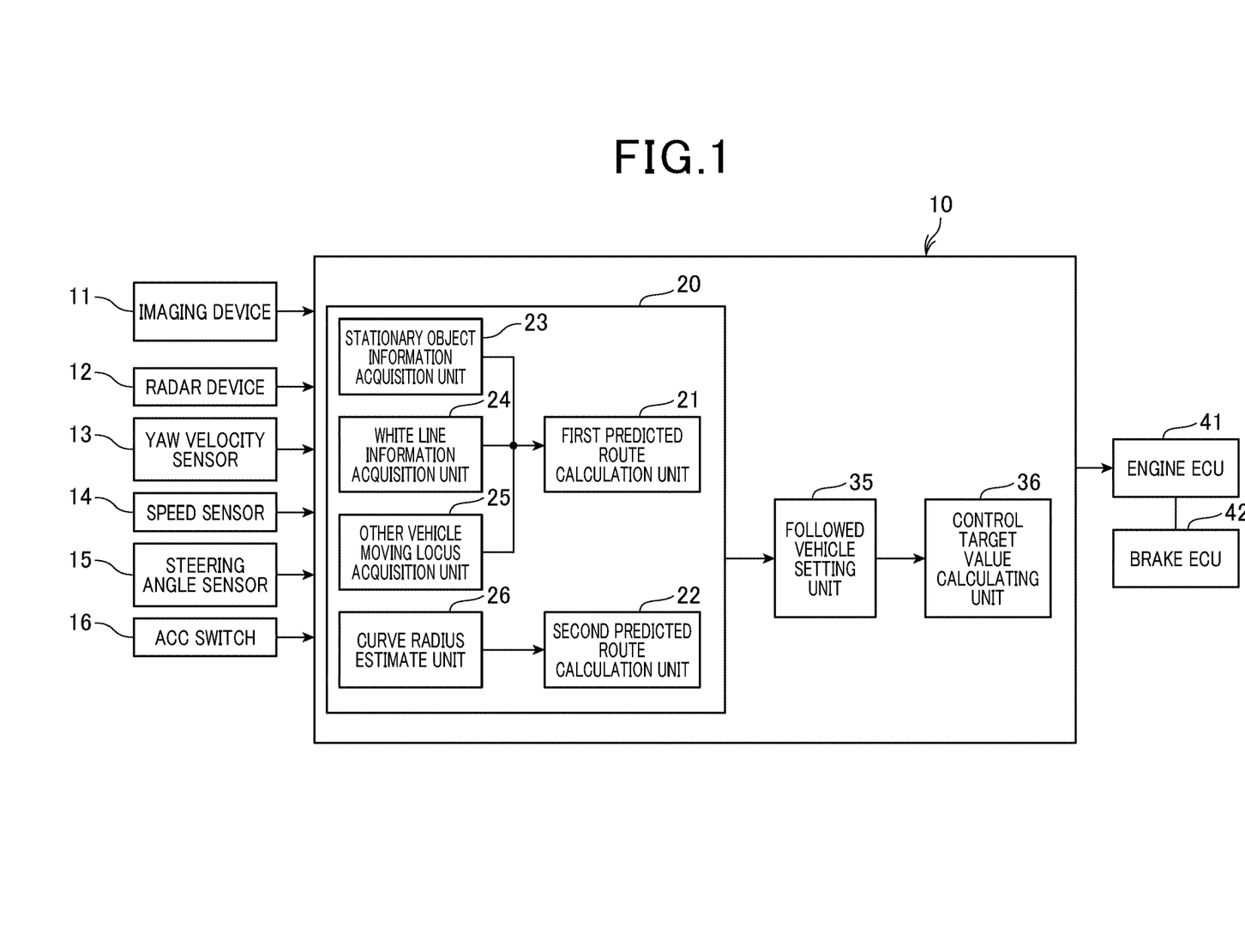
FIG. 1 is a block diagram illustrating a schematic configuration of the vehicle cruise control apparatus.

In FIG. 1, the cruise control apparatus 10 is a computer provided with a central processing unit (CPU), a random access memory (RAM), a read-only memory (ROM), an input/output (I/O), and the like. The cruise control apparatus 10 includes a route prediction unit 20, a followed vehicle setting unit 35 and a control target value calculating unit 36, wherein the CPU realizes each of these functions by executing the program installed in the ROM. An object detection means for detecting an object present in the vicinity of the vehicle is mounted on the vehicle (own vehicle). The cruise control apparatus 10 receives the detection information of the object from the object detection means, and executes the vehicle-following control with respect to the preceding vehicle on the basis of the inputted information. An imaging device 11 and a radar device 12 are provided in the vehicle as an object detection means.

The imaging device 11 is an onboard camera, and is constituted by a charge-coupled device (CCD) camera, a complementary metal-oxide-semiconductor (CMOS) image sensor, a near infrared camera, and the like. The imaging device 11 captures images of the peripheral environment including the traveling road of the own vehicle, and produces image data indicating the captured image to sequentially output to the cruise control apparatus 10. The imaging device 11 is installed, for example, in the vicinity of the upper side of the front windshield of the own vehicle, and captures images of a region that spreads over a predetermined angle range θ1 toward the forward direction of the vehicle in the center of the imaging axis. Note that, the imaging device 11 may be a monocular camera, or may be a stereo camera.

The radar device 12 is a detection device for detecting objects by transmitting electromagnetic waves as transmission waves, and receiving the reflected waves, and the present embodiment is constituted by a millimeter-wave radar. The radar device 12 is attached to the front of the own vehicle, and a radar signal scans the region that spreads over a predetermined angle range θ2 (θ2<θ1) toward the forward direction of the vehicle in the center of the optical axis. Moreover, the radar device 12 creates the distance measurement data based on the time until the reflected wave is received after transmitting electromagnetic waves to the forward direction of the vehicle, and sequentially output the created distance measurement data to the cruise control apparatus 10. The distance measurement data includes information relating to the direction in which the object is present, the distance to the object and the relative velocity.

Note that, the imaging device 11 and the radar device 12 are respectively attached so that the imaging axis which is the reference axis of the imaging device 11 and the optical axis which is the reference axis of the radar device 12 are in the same direction as the direction parallel to the traveling road surface of the own vehicle. The detectable region of the imaging device 11 and the detectable region of the radar device 12 overlap with each other in at least one part. Note that, the radar device 12 corresponds to a "first detection means" and the imaging device 11 corresponds to a "second detection means".

The cruise control apparatus 10 receives the image data from the imaging device 11 and the distance measurement data from the radar device 12, and respectively receives the detection signals from each sensor provided in the vehicle. A yaw velocity sensor 13 for detecting the angular velocity (hereinafter, referred to as the "yaw velocity") to the slewing direction of the vehicle, a speed sensor 14 for detecting the speed and the like are provided as the various sensors. Further, a steering angle sensor 15 for detecting the steering angle, and an ACC switch 16 to be operated when a driver selects the vehicle-following control mode and the like are provided.

The route prediction unit 20 is an arithmetic unit for predicting the travel route of an own vehicle, and is provided with a first predicted route calculation unit 21 and a second predicted route calculation unit 22. Among these units, the first predicted route calculation unit 21 calculates the future travel route of the own vehicle on the basis of the moving locus of the preceding vehicle traveling in front of the own vehicle. Further, the second predicted route calculation unit 22 calculates the future travel route of the own vehicle on the basis of the yaw velocity of the own vehicle.

The first predicted route calculation unit 21 respectively receives the stationary object information from a stationary object information acquisition unit 23, the white line information from a white line information acquisition unit 24, and the moving locus information of the other vehicle from an other vehicle moving locus acquisition unit 25. The first predicted route calculation unit 21 calculates the first predicted route which is the future travel route of the own vehicle by combining the inputted information. Note that, the route prediction of the own vehicle which is independent of the yaw velocity of the own vehicle is possible with the first predicted route calculation unit 21.

The stationary object information acquisition unit 23 calculates the position information relating to the stationary roadside objects (three-dimensional objects, for example, guardrails, walls, and the like) present on the road on which the own vehicle is traveling on the basis of the distance measurement data from the radar device 12, and outputs the position information to the first predicted route calculation unit 21 as the stationary object information. The white line information acquisition unit 24 calculates the information relating to the road section lines (white lines) included in the image captured by the imaging device 11 on the basis of the image data from the imaging device 11, and outputs the calculated information to the first predicted route calculation unit 21 as the white line information. Regarding the specific calculation method of the white line information, the white line information acquisition unit 24, for example, extracts the edge points deemed to be candidates of the white line from the image data on the basis of the rate of change, etc., of the luminance in the horizontal direction of the image. Moreover, the white line information acquisition unit 24 sequentially stores the extracted edge points in one frame and calculates the white line information based on the stored history of the edge points of the white line.

The other vehicle moving locus acquisition unit 25 calculates the preceding vehicle position which is the position of the preceding vehicles (coordinates representing the passing points of the preceding vehicles) with a predetermined cycle on the basis of the distance measurement data (the distance information between the own vehicle and the preceding vehicle and the position information in the lateral direction) from the radar device 12, and stores the calculated preceding vehicle position in the predetermined storage region (storage device) in a time series. The other vehicle moving locus acquisition unit 25 calculates the moving locus of the preceding vehicle based on the time series data of the stored preceding vehicle position and outputs the calculated moving locus to the first predicted route calculation unit 21 as the moving locus information of the other vehicle. Therefore, the other vehicle moving locus acquisition unit 25 functions as a position storage means. Note that, the other vehicle moving locus acquisition unit 25 calculates the moving locus information for not only the vehicles traveling in the same lane as the own vehicle among the preceding vehicles, but also the vehicles traveling in the lane adjacent to the own vehicle, and this calculation is used in the route prediction of the own vehicle.

The second predicted route calculation unit 22 receives the estimated curve radius (hereinafter, referred to as the "estimate R") of the traveling road of the own vehicle from a curve radius estimate unit 26, and the inputted estimate R is used to calculate the second predicted route which is the future travel route of the own vehicle. The curve radius estimate unit 26 calculates the estimate R from the yaw velocity (yaw angle) detected by the yaw velocity sensor 13 and the speed detected by the speed sensor 14. The calculating method of the estimate R is not limited thereto, and the estimate R may be calculated using, for example, the image data, or may be calculated from the steering angle detected by the steering angle sensor 15 and the speed detected by the speed sensor 14. Therefore, the curve radius estimate unit 26 functions as a radius estimating means.

A followed vehicle setting unit 35 uses the predicted route calculated by the route prediction unit 20, and sets the preceding vehicle present on the predicted route among the preceding vehicles traveling in front of the own vehicle as the followed vehicle. The control target value calculating unit 36 calculates the control target value for maintaining the distance between the followed vehicle set by the followed vehicle setting unit 35 and the own vehicle by controlling the travel speed of the own vehicle. Note that, in this case, the control target value calculating unit 36 calculates the control target value for maintaining the distance between vehicles at a preset target interval. Specifically, control values such as the target output of the on-vehicle engine and the requested brake power are calculated, and these control values are outputted to the engine electronic control unit (engine ECU 41) as the control signal. Note that, in the present embodiment, the cruise control apparatus 10 is configured so as to output the control signal to the engine ECU 41, and to output the control signal from the engine ECU 41 to the brake electronic control unit (brake ECU 42). Note that, regarding the output configuration of the control signal, the cruise control apparatus 10 may respectively output a control signal to the engine ECU 41 and the brake ECU 42.

Regarding the route prediction of the own vehicle, the present embodiment validates the route prediction result based on the route prediction result calculated by the first predicted route calculation unit 21, i.e., based on the moving locus of the preceding vehicle, and the result is used to select the followed vehicle. The reason therefor is as follows. While traveling on a straight road, the prediction accuracy hardly changes at all for the first predicted route which is the route prediction result on the basis of the moving locus of the preceding vehicle and the second predicted route which is the route prediction result based on the estimate R.

However, when the followed vehicle enters a curve and the own vehicle is traveling on a straight road before coming to the curve, if the second predicted route is used to select the followed vehicle there is the risk of selecting the preceding vehicle present in the adjacent lane as the followed vehicle instead of selecting the preceding vehicle present in the same lane as the own vehicle. Therefore, the present embodiment preferentially uses the first predicted route to select the followed vehicle.

When using the moving locus of the preceding vehicle to perform the route prediction of the own vehicle, if the data used is for the preceding vehicle making the movement which does not correspond to the shape of the road such as the preceding vehicle making an unexpected lane change, there is concern that the calculation accuracy of the route prediction of the own vehicle will decrease. Taking this point into consideration, the cruise control apparatus 10 according to the present embodiment uses the detection result of the stationary objects such as the section lines of the traveling road and stationary roadside objects (a three-dimensional object, for example, guardrails, walls, and the like) provided along the road, and compares the position of a stationary object with the moving locus of the preceding vehicle. As a result, when it was determined that the moving locus of the preceding vehicle is along the shape of the road, the moving locus of the preceding vehicle is validated. However, when it was determined that the moving locus of the preceding vehicle is not along the shape of the road, the moving locus of the preceding vehicle is invalidated. Moreover, the first predicted route is calculated on the basis of the validated moving locus of the preceding vehicle.

Note that, the configuration for invalidating the moving locus of the preceding vehicle includes the configuration for erasing the moving locus calculated by using the preceding vehicle position and the configuration for preventing the use of the moving locus calculated by using the preceding vehicle position. Further, the configuration for erasing the preceding vehicle position or the vehicle detection point detected by the radar device 12 and the configuration for preventing the use thereof are also included.

Figure 2A:
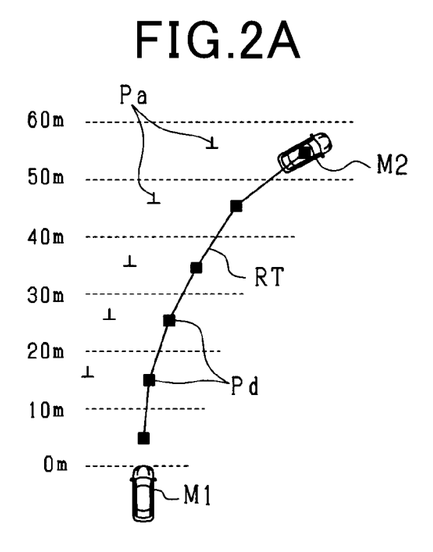
FIG. 2A is a diagram illustrating a moving locus of a preceding vehicle for the case when an own vehicle and the preceding vehicle are traveling on a curved road.
Figure 2B:
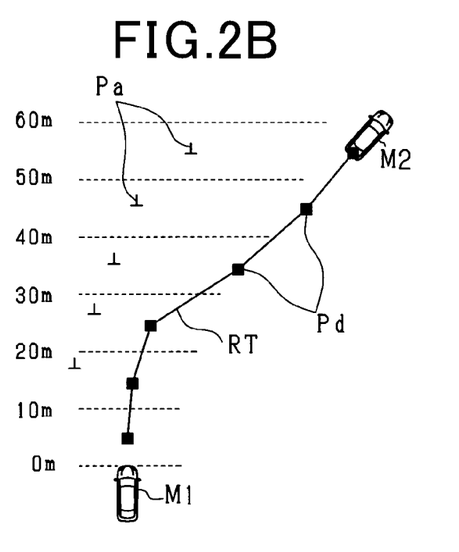
FIG. 2B is a diagram illustrating a case in which the moving locus does not correspond to the shape of the road.

The procedures for calculating the moving locus of the preceding vehicle, the procedures for calculating the first predicted route based on the moving locus, and the procedures for calculating the second predicted route based on the estimate R will be explained hereinafter. FIGS. 2A and 2B are a diagram illustrating the moving locus RT of the preceding vehicle M2 for the case when the own vehicle M1 and the preceding vehicle M2 are traveling on a curved road.

FIGS. 2A and 2B illustrate a plurality of preceding vehicle positions Pd which is the result in which the preceding vehicle M2 was detected by the radar device 12 and a plurality of stationary object detection points Pa which is the result in which a three-dimensional object (for example, a guardrail provided on the side of the road) was detected by the radar device 12 as the stationary roadside object. Note that, the preceding vehicle position Pd averages the plurality of vehicle detection points which is the result detected by the radar device 12 at a predetermined distance interval (for example, a 10 m interval). FIG. 2A illustrates the case in which the moving locus RT of the preceding vehicle M2 which corresponds to (the case which is along) the shape of the road, and FIG. 2B illustrates the case in which the moving locus RT does not correspond to (the case which is not along) the shape of the road. Note that, in the explanation below, the moving locus RT of the preceding vehicle M2 corresponding to the shape of the road will be referred to as "along the shape of the road", and the moving locus RT of the preceding vehicle M2 which does correspond to the shape of the road will be referred to as "is not along the shape of the road".

FIG. 2A illustrates the state in which the preceding vehicle M2 does not make a lane change, and continuously travels in the same lane as the own vehicle M1, and thus, the moving locus RT calculated from the time series data of the preceding vehicle position Pd is along the shape of the road. In this case, when the moving locus RT of the preceding vehicle M2 (each preceding vehicle positions Pd) is compared with the plurality of stationary object detection points Pa of the three-dimensional object (the stationary object), it is understood that the relative positions in the lateral direction become generally constant in relation to the travel direction of the own vehicle M1. Therefore, the moving locus RT of the preceding vehicle M2 is along the shape of the road during traveling, and thus, is recognized to be valid as the moving locus which is used in the route prediction of the own vehicle M1.

On the other hand, FIG. 2B illustrates the state in which the preceding vehicle M2 makes a lane change to a lane on the right side, and the moving locus RT calculated from the time series data of the preceding vehicle position Pd is not along the shape of the road. In this case, when the moving locus RT of the preceding vehicle M2 (each preceding vehicle position Pd) is compared with the plurality of stationary object detection points Pa of the three-dimensional object (stationary object), it is understood that the relative positions in the lateral direction are not constant in relation to the travel direction of the own vehicle M1. Therefore, the moving locus RT of the preceding vehicle M2 is not along the shape of the road during traveling, and thus, is recognized as being invalid as the moving locus used in the route prediction of the own vehicle M1. Note that, in FIGS. 2A and 2B, the position of a stationary object present in the left direction in relation to the travel direction of the own vehicle M1 is compared with the moving locus RT of the preceding vehicle M2, but a stationary object present in the right direction in relation to the travel direction of the own vehicle M1 is also included in a comparison target.

Figure 3A:
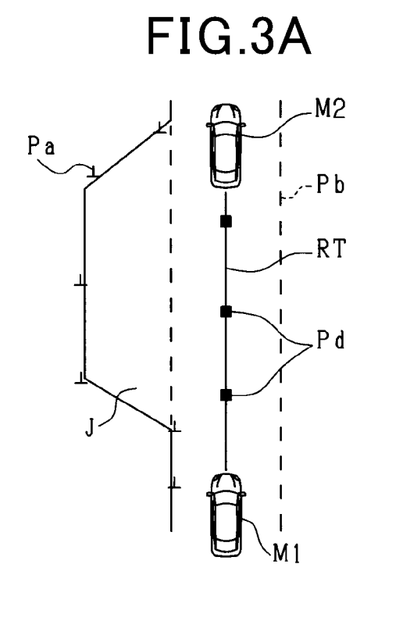
FIG. 3A is an explanatory view in the case when section lines and a guardrail are set as stationary objects in the own vehicle, and each of these positions is calculated.
Figure 3B:
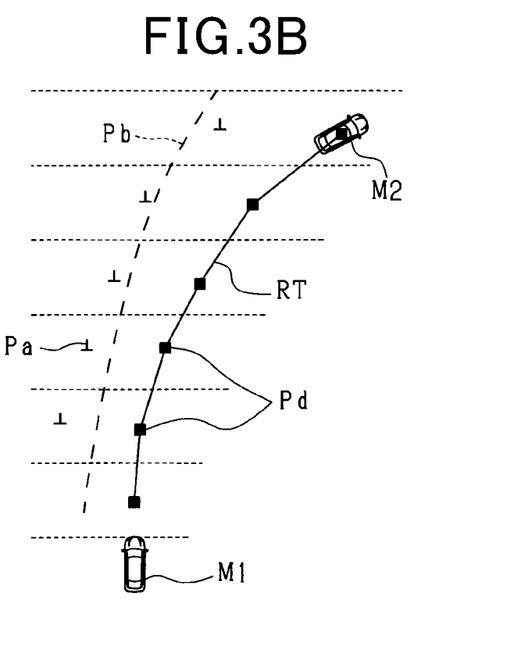
FIG. 3B is another explanatory view in the case when section lines and a guardrail are set as stationary objects in the own vehicle, and each of these positions is calculated.

FIGS. 3A and 3B are explanatory views in the case when the section lines (white lines) and the guardrail are set as the stationary objects in the own vehicle M1, and each of these positions is calculated. FIGS. 3A and 3B illustrate the plurality of stationary object detection points Pa detected as the guardrail on the side of the road and the section lines (white lines) Pb for sectioning the lanes on the road. Further, FIG. 3A illustrates a turn-out J (area in which the vehicle may turn off from the road) provided in a part of the side of the road of a straight road. However, FIG. 3B illustrates a guard fence for construction provided at the side of the road. In this case, the arrangement of the stationary object detection point Pa does not match with the shape of the section line Pb.

In FIG. 3A, as the preceding vehicle M2 is moving straight, the moving locus RT of the preceding vehicle M2 can be obtained linearly. Further, the section line Pb is also recognized linearly. On the other hand, the stationary object detection point Pa is detected by expanding laterally in accordance with the turn-out J. When the moving locus RT of the preceding vehicle M2 (each of the preceding vehicle positions Pd) is compared with the plurality of stationary object detection points Pa of the three-dimensional object (stationary object), it is understood that the relative positions in the lateral direction are constant in relation to the travel direction of the own vehicle M1. On the other hand, when the moving locus RT of the preceding vehicle M2 is compared with the section line Pb, it is understood that the relative positions in the lateral direction become constant in relation to the travel direction of the own vehicle M1. In this case, the moving locus RT of the preceding vehicle M2 is recognized as being valid as the moving locus used in the route prediction of the own vehicle M1 based on the relative positions of the moving locus RT and the section line Pb being constant in the lateral direction.

Further, in FIG. 3B, the preceding vehicle M2 intentionally travels with the guard fence and not the line Pb. Therefore, when the moving locus RT of the preceding vehicle M2 (each preceding vehicle position Pd) is compared with the plurality of stationary object detection points Pa of the three-dimensional object (stationary object), it is understood that the relative positions in the lateral direction become constant in relation to the travel direction of the own vehicle M1. On the other hand, when the moving locus RT of the preceding vehicle M2 is compared with the section line Pb, it is understood that the relative positions in the lateral direction are not constant in relation to the travel direction of the own vehicle M1. In this case, the moving locus RT of the preceding vehicle M2 is recognized as being valid as the moving locus used in the route prediction of the own vehicle M1 based on the relative positions of the moving locus RT and the stationary object detection point Pa being constant in the lateral direction.

Figure 4:
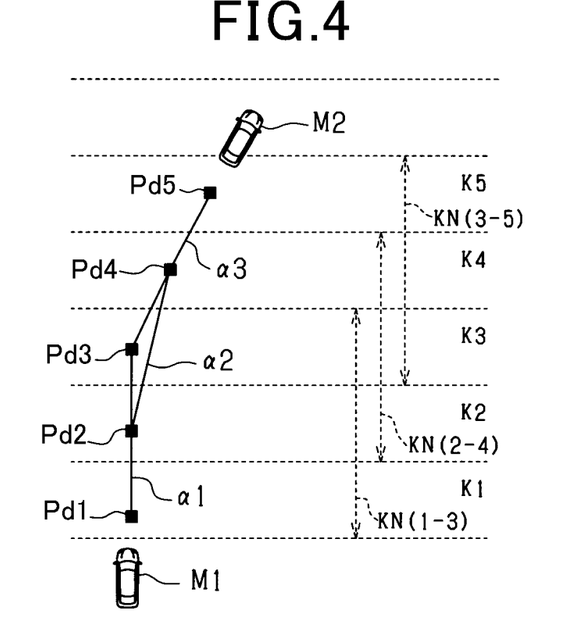
FIG. 4 is a diagram for explaining the procedures for calculating a moving locus.

Next, the procedures for calculating the moving locus RT in order to use the time series data of the preceding vehicle position Pd belonging to the moving locus RT of the preceding vehicle M2 which was recognized as being validated as the moving locus used in the route prediction of the own vehicle M1 to specify the followed vehicle are explained in FIG. 4.

In the present embodiment, as shown in FIG. 4, a plurality of sections K (K1-K5 in FIG. 4) are set at, for example, 10 m intervals in the forward direction of the own vehicle M1, and the preceding vehicle positions Pd (Pd1-Pd5 in FIG. 4) are calculated for each section. Further, three or more sections are set as one unit section KN, and the straight road α (α1-α3 in FIG. 4) is calculated on the basis of the preceding vehicle position Pd for the unit sections KN. In this case, in the present embodiment, the unit sections KN are set so as to overlap at a part in the inter-vehicular section from the own vehicle M1 to the preceding vehicle M2. Moreover, the moving locus RT for specifying the followed vehicle is calculated by composing the straight road α of each unit section KN.

Specifically, in the present embodiment, first, the sections K1-K3 are set as one unit section KN (1-3) to calculate the straight road α1. Next, the sections K2-K4 are set as one unit section KN (2-4) to calculate the straight road α2. Next, the sections K3-K5 are set as one unit section KN (3-5) to calculate the straight road α3. At this time, when calculating the straight road α1 of the unit sections KN (1-3), the straight road α1 is calculated by connecting the preceding vehicle positions Pd1 and Pd3 respectively corresponding to section K1 and section K3 positioned on both sides and sandwiching section K2 in the middle in a straight line. The other unit sections are calculated in the same manner. Note that, the method for calculating the straight road α of the unit section KN is not limited to the aforementioned method for connecting the preceding vehicle positions Pd (two preceding vehicle positions) of the respective sections K positioned on both sides of the unit section KN in a straight line. For example, it is possible to use all of the preceding vehicle positions Pd (in FIG. 4, three preceding vehicle positions) included in each unit section KN to calculate the straight road α by a linear approximation operation, etc. Further, the unit section KN may include four or more sections K.

Moreover, in the present embodiment, regarding the calculated straight road α1-α3, each straight road α1-α3 is connected by appropriately sliding in the lateral direction. At this time, when connecting (composing) each straight road α1-α3, the starting point (the end point of the own vehicle M1 side) of the straight road α1 is set as the forward position of the own vehicle M1. Next, the starting point of the straight road α2 is set as the preceding vehicle position Pd2 on the straight road α1, and the starting point of the straight road α3 is set as the preceding vehicle position Pd4 on the straight road α2. In the present embodiment, the preceding vehicle positions Pd1, Pd2, Pd4 and Pd5 are connected in a straight line, and are connected (composed) with each straight road α1-α3 thereby. In the present embodiment, by calculating the moving locus RT in such a manner, even if noise (spatial noise) is included in any of the preceding vehicle positions Pd, it is possible to eliminate the noise to calculate the moving locus RT for specifying the followed vehicle.

Note that, there are cases when a plurality of preceding vehicles M2 are present in the forward direction of the own vehicle M1 and the position of each of these preceding vehicles M2 are in front and behind each other (for example, when the preceding vehicles M2 are respectively present in the same lane as the own vehicle M1 and the adjacent lane). In this case, the final moving locus RT may be calculated by calculating the moving locus RT for the respective preceding vehicles M2 by the aforementioned method and connecting each calculated moving locus RT. Further, the connection of the moving locus RT may be made by sliding, for example, among the two preceding vehicles M2, the moving locus RT of the preceding vehicle M2 far (on the back side of) from the own vehicle M1 in the lateral direction relative to the moving locus RT of the preceding vehicle M2 close to (in front of) the own vehicle M1. In this case, the length of the moving locus RT can extend more than when calculating the moving locus RT on the basis of the preceding vehicle position Pd of one preceding vehicle M2.

Further, for example, among the two preceding vehicles M2, when the moving locus RT of one of the preceding vehicles M2 and the moving locus RT of the other preceding vehicle M2 are discontinuous, only the moving locus RT of the preceding vehicle M2 close to the own vehicle M1 may be validated. Alternatively, the moving locus RT may be interpolated by the estimate R which is the estimated curve radius of the road for estimating the discontinuous portion between two moving locus RT from the turning information (the yaw velocity and the steering angle) and the speed of the own vehicle M1, or by the estimate from the estimate R which is estimated from the image data.

The history (time series data of the preceding vehicle positions Pd) of the positions of the preceding vehicle M2 can only be obtained by the inter-vehicular section from the own vehicle M1 to the preceding vehicle M2. Therefore, the predicted route of the own vehicle M1 which may be calculated based on the moving locus RT of the preceding vehicle M2 is limited to the inter-vehicular section. Therefore, in the present embodiment, the first predicted route is calculated on the basis of the moving locus RT of the preceding vehicle M2 as stated above for the inter-vehicular section from the own vehicle M1 to the preceding vehicle M2. Further, the predicted route of the own vehicle M1 is calculated by extending the first predicted route calculated based on the moving locus RT of the preceding vehicle M2 by the second predicted route calculated based on the estimate R which is the estimated curve radius of the road for the section which is further away than the inter-vehicular section. Accordingly, in the present embodiment, the prediction of the travel route of the own vehicle M1 which is further away is possible.

Figure 5:
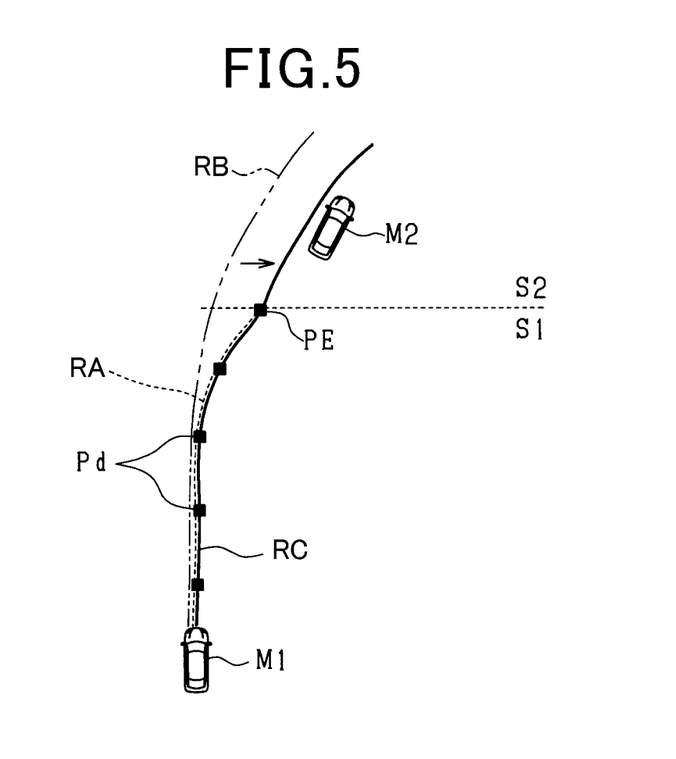
FIG. 5 is an explanatory view for explaining the procedures using the estimate R to extend the predicted route.

FIG. 5 is an explanatory view for explaining the process which uses the first predicted route based on the moving locus RT of the preceding vehicle M2 and the second predicted route based on the estimate R which is the estimated curve radius of the road to extend the predicted route of the own vehicle M1. Note that, in FIG. 5 the first predicted route RA based on the moving locus RT of the preceding vehicle M2 is indicated by a dashed line, the second predicted route RB based on the estimate R is indicated by alternate long and two short dashed lines, and the predicted route RC of the own vehicle M1 composed and extended therefrom is indicated by a solid line.

In FIG. 5, in the region in front of the own vehicle M1, the region S1 close to the own vehicle M1 is the region in which the history of the positions of the preceding vehicle M2 (time series data of the preceding vehicle positions Pd) can be obtained (is present). However, the region S2 further from the own vehicle M1 than the region S1 is the region in which the history of the positions of the preceding vehicle M2 cannot be obtained (is not present). The present embodiment calculates the moving locus RT of the preceding vehicle M2 from the time series data of the preceding vehicle position Pd for the inter-vehicular section (region S1) from the own vehicle M1 to the preceding vehicle M2. Next, the first predicted route RA is calculated on the basis of the calculated moving locus RT. Further, the second predicted route RB is calculated on the basis of the estimate R for the section (region S2) further away than the inter-vehicular section (region S1). In the present embodiment, the second predicted route RB calculated based on the estimate R is connected to the position PE on the first predicted route RA which is the end position of the moving locus RT of the preceding vehicle M2. The predicted route is extended and the extended predicted route RC of the own vehicle M1 is calculated thereby.

Next, the predicted route calculation process of the cruise control apparatus 10 according to the present embodiment will be explained using FIG. 6 and FIG. 7. These processes are conducted by the route prediction unit 20. Further, the processes are executed in each predetermined period by the ECU of the cruise control apparatus 10 during vehicle travel and when the ACC switch 16 is in an on-state.

Figure 6:
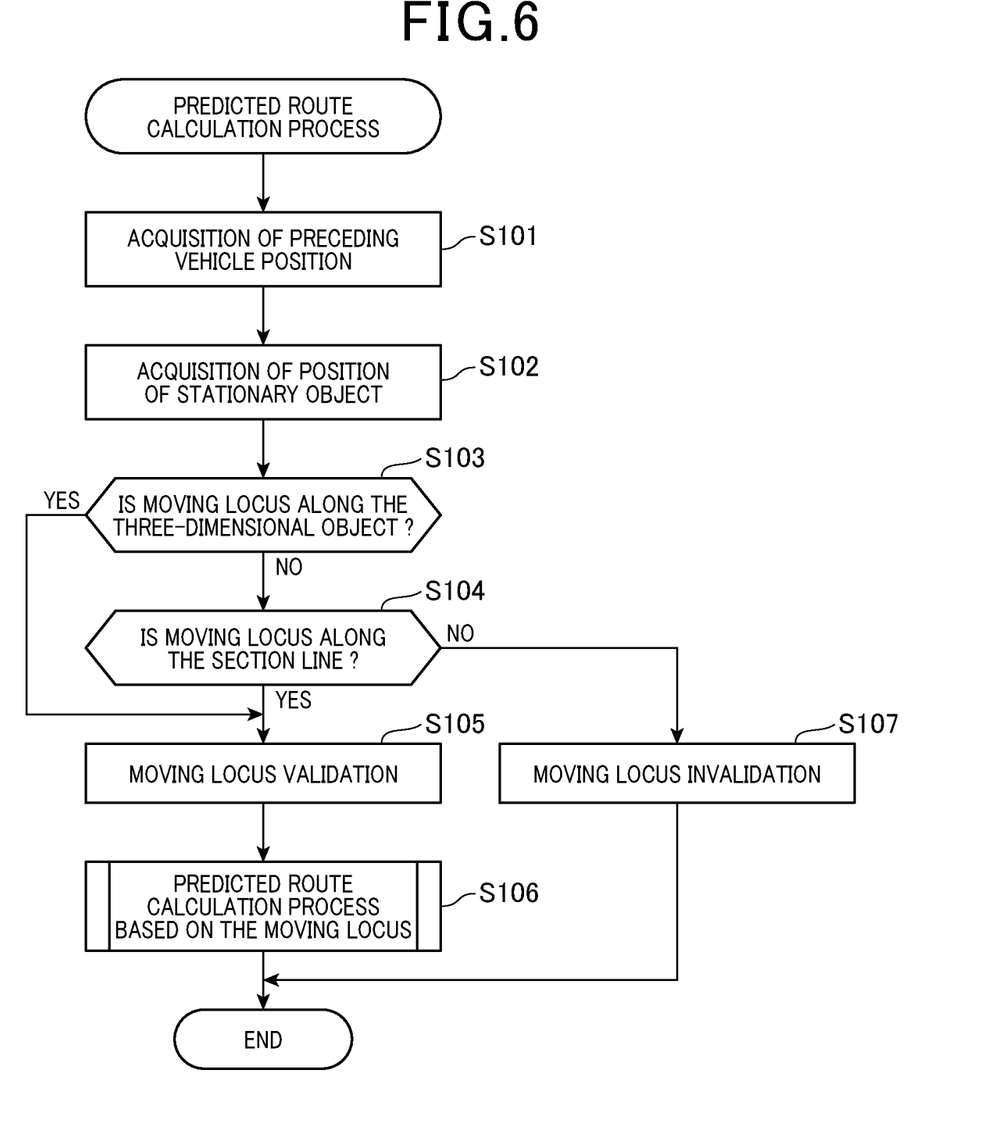
FIG. 6 is a flowchart illustrating the process procedures of the predicted route calculation process.
Figure 7:
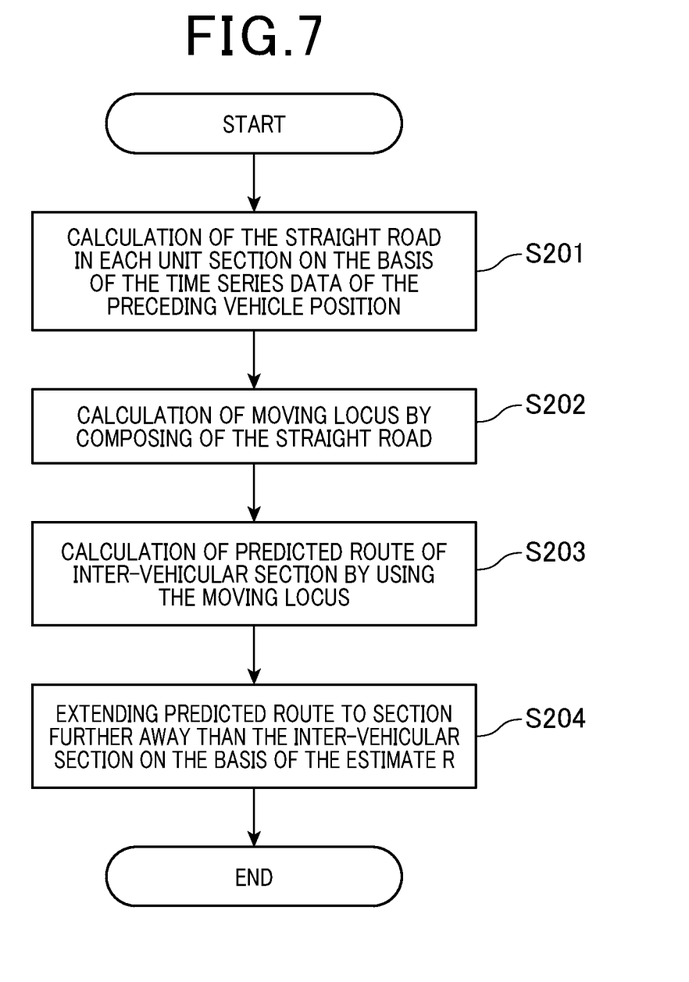
FIG. 7 is a flowchart illustrating the process procedures of the predicted route calculation process based on the moving locus.

As shown in FIG. 6, the cruise control apparatus 10 obtains the time series data (the history of the positions of the preceding vehicle M2) of the preceding vehicle position Pd in step S101. Note that, when a plurality of preceding vehicles M2 are present, the determination processes of the following step S103 and step S104 are performed for the moving locus RT of the vehicles. Next, the cruise control apparatus 10 acquires the position of a stationary object (stationary object detection point Pa) in the following step S102. In step S102, a three-dimensional object (for example, a guardrail, a median, a guard fence, etc.) on the road or extending along the side of the road and the section lines Pb on the road are set as the stationary objects, and the position information thereof is acquired. Note that, the position information of the three-dimensional object is acquired by the distance measurement data from the radar device 12, and the position information of the section line Pb is acquired by the image data from the imaging device 11.

Next, in the cruise control apparatus 10, the moving locus RT of the preceding vehicle M2 calculated in step S103 based on the time series data of the preceding vehicle position Pd is compared with the position of the three-dimensional object, and it is determined whether or not the moving locus RT is along the three-dimensional object (whether or not it is along the shape of the road). Step S103 determines whether or not the relative positions of the preceding vehicle position Pd and the stationary object detection point Pa match in the lateral direction in relation to the travel direction of the own vehicle M1 by comparing the plurality of preceding vehicle positions Pd acquired in step S101 with the plurality of stationary object detection points Pa of the three-dimensional object acquired in step S102. More specifically, the cruise control apparatus 10 extracts the combination of the preceding vehicle position Pd and the stationary object detection point Pa in which the position of the travel direction of the own vehicle M1 is the same, and calculates the distance in the lateral direction between the preceding vehicle position Pd and the stationary object detection point Pa with a plurality of points. When the difference of the distance in the comparison of the plurality of points is a predetermined value or less, it is determined that the relative positions in the lateral direction match in relation to the travel direction of the own vehicle M1. Therefore, in the cruise control apparatus 10, the route prediction unit 20 functions as the trajectory determination means.

Note that, the method for determining whether or not the moving locus RT of the preceding vehicle M2 is along the three-dimensional object (whether or not it is along the shape of the road) is not limited to the aforementioned method. For example, this may be determined based on the distance between an arbitrary point on the moving locus RT in which the position of the travel direction of the own vehicle M1 is the same and an arbitrary point on the line connecting the stationary object detection points Pa.

Further, in step S104, the cruise control apparatus 10 compares the moving locus RT calculated based on the time series data of the preceding vehicle position Pd with the section line Pb and determines whether or not the moving locus RT is along the section line Pb (whether or not it is along the shape of the road). Step S104 determines whether or not the relative positions of the moving locus RC and the section line Pb match in the lateral direction in relation to the travel direction of the own vehicle M1. More specifically, the cruise control apparatus 10 extracts a plurality of relative positions in the lateral direction between the moving locus RT in relation to the travel direction of the own vehicle M1 and the section line Pb. When the difference between the relative positions in the comparison of the plurality of points is a predetermined value or less, it is determined that the relative positions in the lateral direction match in relation to the travel direction of the own vehicle M1.

Note that, the trajectory created by connecting the plurality of preceding vehicle positions Pd by a straight line is used as the moving locus RT of the preceding vehicle M2 used in the comparison process of step S103 and step S104 in order to perform the determination of the validity/invalidity of the moving locus RT simply. However, from the viewpoint of making the determination accuracy higher, the moving locus RT of the preceding vehicle M2 obtained by the aforementioned calculating method explained using FIG. 4 may be used as the determination process of the validation/invalidation of the moving locus RT.

As a result, if the cruise control apparatus 10 determines, in step S103, that the moving locus RT of the preceding vehicle M2 is along the three-dimensional object (along the shape of the road) (when S103 is YES), it proceeds to the process of step S105. Similarly, if the cruise control apparatus 10 determines, in step S104, that the moving locus of the preceding vehicle RT is along the section line Pb (along the shape of the road) (when S104 is YES), it proceeds to the process of step S105. The cruise control apparatus 10 recognizes (judges) that the moving locus RT of the preceding vehicle M2 is valid in step S105. Next, the cruise control apparatus 10 calculates the predicted route (first predicted route RA) on the basis of the moving locus RT which was recognized as being validated by step S106. Therefore, in the cruise control apparatus 10, the route prediction unit 20 functions as the course calculation means.

However, if the cruise control apparatus 10 determines, in step S103, that the moving locus RT of the preceding vehicle M2 is not along the three-dimensional object (is not along the shape of the road) (when S103 is NO), it proceeds to the process of step S104. Further, if the cruise control apparatus 10 determines, in step S104, that the moving locus of the preceding vehicle RT is not along the section line Pb (is not along the shape of the road) (when S104 is NO), it proceeds to the process of step S107. The cruise control apparatus 10 recognizes (judges) that the moving locus RT regarding the preceding vehicle M2 is invalid in step S107. Note that, when there is no valid moving locus RT, the predicted route (second predicted route RB) is calculated on the basis of the estimate R, and the predicted route is used to specify the followed vehicle.

Next, the predicted route calculation process (process of step S106) based on the moving locus RT will be explained using FIG. 7. As shown in FIG. 7, the cruise control apparatus 10 calculates the straight road α in the unit sections KN on the basis of the time series data of the preceding vehicle position Pd in step S201. Next, the moving locus RT is calculated by composition of the straight roads α (connecting the straight roads α) of the unit section KN in step S202, and the moving locus RT is used to calculate the predicted route (first predicted route RA) of the inter-vehicular section in step S203. Note that, when a plurality of preceding vehicles M2 is present in the forward direction of the own vehicle M1 and the moving locus RT of the plurality of preceding vehicles M2 are recognized as being validated, and the recognized as being validated plurality of moving loci RT are composed. Further, when there is one preceding vehicle M2 in which the moving locus RT is valid, the predicted route (first predicted route RA) of the inter-vehicular section is calculated by performing a weighted average with the white line information regarding the moving locus RT of the preceding vehicle M2. However, when there are a plurality of preceding vehicles M2 in which the moving locus RT is valid, the predicted route (first predicted route RA) of the inter-vehicular section is calculated by performing a weighted average with the white line information regarding the moving locus RT composed thereof.

Then, the cruise control apparatus 10 extends the predicted route of the own vehicle M1 to the section (region S2) further away than the inter-vehicular section (region S1) on the basis of the estimate R in step S204. More specifically, the second predicted route RB calculated based on the estimate R is connected to the first predicted route RA calculated based on the moving locus RT to extend the predicted route to thereby obtain the extended predicted route RC of the own vehicle M1. Moreover, the cruise control apparatus 10 ends this routine. Note that, the present embodiment uses the predicted route calculated by this routine in order to perform the specification of the followed vehicle.

The aforementioned present embodiment can obtain the following excellent result.

The cruise control apparatus 10 according to the present embodiment is configured to determine whether or not the moving locus RT is along the shape of the road by comparing the position of a stationary object (stationary object detection point Pa) such as the section line Pb of the traveling road and the guardrail, etc., of the side of the road with the moving locus RT of the preceding vehicle M2. Further, when it was determined that the moving locus RT is along the shape of the road, the moving locus RT of the preceding vehicle M2 is validated. On the other hand, when it was determined that the moving locus RT is not along the shape of the road, the moving locus RT is invalidated. Moreover, the predicted route of the own vehicle M1 is calculated on the basis of the validated moving locus RT. Therefore, the cruise control apparatus 10 according to the present embodiment invalidates the moving locus RT of the preceding vehicle M2, when the preceding vehicle M2 makes an unexpected movement which does not correspond to the road, and can suppress the predicted route of the own vehicle M1 from being erroneously calculated.

The cruise control apparatus 10 according to the present embodiment is configured to validate the moving locus RT when a three-dimensional object provided on the road or along the side of the road and the section line Pb on the road are set as stationary objects, and the moving locus RT of the preceding vehicle M2 is along at least one of the three-dimensional object and the section line Pb. Numerous items other than guardrails, such as street trees and standing signboards may be assumed as the three-dimensional object on the side of the road, and it is considered that for estimating the shape of the road, there are many objects which can become a disturbance. Therefore, when the three-dimensional object is excluded from the comparison target of the moving locus RT of the preceding vehicle M2, only the comparison between the section line Pb and the moving locus RT is performed. As a result, because of the narrow range in which the section line Pb is recognizable, there is the risk that the determination accuracy will decrease. Taking this point into account, the cruise control apparatus 10 according to the present embodiment maintains a balance between the suppression of the decrease of the prediction accuracy due to the inappropriate use of data and securing execution opportunities of the predicted route based on the moving locus RT by the aforementioned configuration, and thus, can execute the cruise control based on the route prediction.

The moving locus RT of the preceding vehicle M2 can only be obtained by the inter-vehicular section from the own vehicle M1 to the preceding vehicle M2. Therefore, the predicted route of the own vehicle M1 which can be calculated based on the moving locus RT of the preceding vehicle M2 is limited to the inter-vehicular section. Therefore, the cruise control apparatus 10 according to the present embodiment is constituted to use the estimate R which is the estimated curve radius of the road to extend the predicted route of the own vehicle M1. As a result, the cruise control apparatus 10 according to the present embodiment can predict the travel route further away from the own vehicle M1, and can predict the course of the own vehicle M1 to a preceding vehicle M2 positioned further away. The selected range of the vehicle which is the target for the cruise control based on the route prediction can be enlarged thereby, and is suitable for executing the cruise control based on the route prediction.

The cruise control apparatus 10 according to the present embodiment is constituted so as to calculate the straight road α in the unit sections KN, calculate the moving locus RT of the preceding vehicle M2 due to the composition of the straight road α, and use the calculated moving locus RT to calculate the predicted route (first predicted route RA) for the vehicle-following control. It is possible for the cruise control apparatus 10 according to the present embodiment to eliminate the spatial noise, and a route prediction having a high accuracy even when traveling a road having a complicated shape such as an S-shape can be performed thereby.

Other Embodiments

The present disclosure is not limited to the aforementioned embodiment, and may be executed as follows.

In the aforementioned embodiment, the first predicted route calculation unit 21 is constituted to receive the stationary object information, the white line information and the moving locus information of the other vehicle, and calculate the predicted route by using the inputted information. The method for calculating the predicted route is not limited thereto, and, for example, may be a method which does not perform a weighted average with the white line information.

The aforementioned embodiment is constituted so that when the three-dimensional object on the road or extending along the side of the road and the section line Pb on the road is set as the stationary object, and it is determined that the moving locus RT of the preceding vehicle M2 is along at least one of the three-dimensional object and the section line Pb, the moving locus RT is validated. Further, when it was determined that the moving locus RT of the preceding vehicle M2 is not along both of the three-dimensional object and the section line Pb, the moving locus RT is invalidated. However, the configuration for performing the determination of the validation/invalidation of the moving locus RT is not limited thereto. For example, the moving locus RT may be validated when only the three-dimensional object is set as the comparison target and it is determined that the moving locus RT is along the three-dimensional object, and the moving locus RT may be invalidated when it was determined that the moving locus RT is not along the three-dimensional object. Further, only the section line Pb may be used in the comparison target with the moving locus RT.

The aforementioned embodiment is constituted to calculate the straight road α in the unit sections KN, and to calculate the moving locus RT of the preceding vehicle M2 due to the composition of the straight road α, but the configuration for calculating the moving locus RT is not limited thereto. For example, the moving locus RT may be calculated by connecting the plurality of preceding vehicle positions Pd with a straight line, and the moving locus RT may be calculated by the average of the plurality of vehicle detection points included in the distance measurement data.

The aforementioned embodiment is constituted so as to determine whether or not the moving locus RT is along the shape of the road by the comparison between the section line Pb which is actually recognized by the imaging device 11 and the moving locus RT of the preceding vehicle M2, but the configuration for determining the moving locus RT is not limited thereto. For example, whether or not the moving locus RT is along the shape of the road may be determined by the comparison between the predicted route in which the section line Pb which is actually recognized by the imaging device 11 was extended to a far distance and the moving locus RT.

The aforementioned embodiment is constituted so that when the moving locus RT is invalidated on the basis of the comparison result between the moving locus RT of the preceding vehicle M2 and the position of a stationary object, and a valid moving locus RT is not present, the predicted route (second predicted route RB) calculated on the basis of the estimate R is validated, but is not limited thereto. When a valid moving locus RT is not present, for example, the route prediction may be prevented.

The aforementioned embodiment is constituted so that whether or not the relative positions of the moving locus RT of the preceding vehicle M2 and the stationary object detection point Pa are constant is determined based on the position deviation amount in the lateral direction in relation to the travel direction of the own vehicle M1, but the present disclosure is not limited thereto. When determining whether or not the relative positions in the lateral direction are constant in relation to the travel direction of the own vehicle M1, the determination may be performed by, for example, a shape comparison between the section line Pb on the road and the moving locus RT and a shape comparison between the moving locus RT and the line connecting with the stationary object detection point Pa.

The aforementioned embodiment includes the imaging device 11 and the radar device 12 as the object detection means, but it is not limited thereto, and the imaging device 11 and the radar device 12 may be used in, for example, the configuration in which ultrasound is used in the transmission wave to provide sonar for detecting an object. Further, the technology of the present disclosure may be applied to a vehicle in which an imaging device 11 is not mounted.

The aforementioned embodiment was explained regarding the case when using in a vehicle-following control for traveling following a preceding vehicle M2 traveling in the same lane as the own vehicle M1. The technology of the present disclosure may be used in the route prediction of the own vehicle M1 for avoiding a collision between the own vehicle M1 and the other vehicle. Note that, the technology of the present disclosure can be realized in various forms such as a program for executing each functional unit (each means) constituting the aforementioned cruise control apparatus 10 in a computer, and, a medium which stores the program, and furthermore, a vehicle cruise control method.

REFERENCE SIGNS LIST

10 . . . Cruise control apparatus, 11 . . . Imaging device, 12 . . . Radar device, 13 . . . Yaw velocity sensor, 20 . . . Route prediction unit, 21 . . . First predicted route calculation unit, 22 . . . Second predicted route calculation unit, 23 . . . Stationary object information acquisition unit, 24 . . . White line information acquisition unit, 25 . . . Other vehicle moving locus acquisition unit, 26 . . . Curve radius estimate unit, 35 . . . Followed vehicle setting unit, 36 . . . Control target value calculating unit, 41 . . . Engine ECU. 42 . . . Brake ECU.

The invention claimed is:

1. A vehicle cruise control apparatus for controlling traveling of an own vehicle based on a predicted route which is a future travel route of the own vehicle, deciding a control target for maintaining distance from preceding vehicles traveling in front of the own vehicle, and controlling the own vehicle according to the decided control target, the vehicle cruise control apparatus comprising:

an object detection means for detecting a position of a stationary object provided on a road or along the road on a side of the road on which the own vehicle travels;

a position storage means for storing, in a time series, a preceding vehicle position which is a position of a preceding vehicle traveling in front of the own vehicle;

a trajectory determination means for comparing a moving locus of the preceding vehicle which is a trajectory of the preceding vehicle position stored in the position storage means with the position of the stationary object detected by the object detection means to determine whether or not the moving locus of the preceding vehicle is along a shape of the road; and a course calculation means for validating the moving locus of the preceding vehicle based on determining by the trajectory determination means that the moving locus of the preceding vehicle is along the shape of the road, invalidating the moving locus of the preceding vehicle based on determining that the moving locus is not along the shape of the road, and calculating the predicted route to perform the control of the own vehicle for the control target decided from the preceding vehicles based on the validated moving locus of the preceding vehicle, wherein the object detection means includes a first detection means for detecting one or more three-dimensional objects provided on the road or along the road on the side of the road as the stationary object, and a second detection means for detecting a section line on the road, the trajectory determination means determines whether or not the moving locus of the preceding vehicle is along the shape of the road by determining whether or not the moving locus of the preceding vehicle is along at least one of the three-dimensional objects detected by the first detection means and the section line detected by the second detection means, and the course calculation means validates the moving locus of the preceding vehicle in response to determining that the moving locus of the preceding vehicle is along the three-dimensional object or determining that the moving locus of the preceding vehicle is along the section line when determining that the moving locus of the preceding vehicle is not along the three-dimensional object.

2. The vehicle cruise control apparatus according to claim 1 comprising a radius estimating means for estimating a curve radius of the road of the own vehicle, wherein the course calculation means calculates the predicted route based on the moving locus of the preceding vehicle for a first section from the own vehicle to the preceding vehicle and calculates the predicted route by extending the predicted route calculated based on the moving locus of the preceding vehicle based on the curve radius estimated by the radius estimating means for a second section, the second section being part of a future travel route of the own vehicle, the second section being farther from the own vehicle than the first section, wherein the second section comprises a forward end which is farther ahead of the preceding vehicle than a forward end of the first section.

3. The vehicle cruise control apparatus according to claim 1, wherein the course calculation means calculates the predicted route to perform vehicle-following control of the own vehicle for the control target decided from the preceding vehicles based on of the validated moving locus of the preceding vehicle.

4. A vehicle cruise control method for controlling traveling of an own vehicle based on a predicted route which is a future travel route of the own vehicle, deciding a control target for maintaining distance from preceding vehicles traveling in front of the own vehicle, and controlling the own vehicle according to the decided control target, the method comprising:

a step of detecting a position of a stationary object provided on a road or along the road on a side of the road on which the own vehicle travels by using a predetermined detection device;

a step of storing, in a time series, a preceding vehicle position which is a position of a preceding vehicle traveling in front of the own vehicle in a storage device;

a step of comparing a moving locus of the preceding vehicle which is a trajectory of the preceding vehicle position stored in the storage device with the position of the stationary object detected by the predetermined detection device to determine whether or not the moving locus of the preceding vehicle is along a shape of the road; and a step of validating the moving locus of the preceding vehicle based on determining that the moving locus of the preceding vehicle is along the shape of the road, invalidating the moving locus of the preceding vehicle based on determining that the moving locus of the own vehicle is not along the shape of the road, and calculating the predicted route to perform the control of the own vehicle for the control target decided from the preceding vehicles based on the moving locus of the preceding vehicle, wherein the step of detecting the position of the stationary object includes detecting one or more three-dimensional objects provided on the road or along the road on the side of the road as the stationary object, and detecting a section line on the road, the step of comparing the moving locus with the position of the stationary object includes determining whether or not the moving locus of the preceding vehicle is along at least one of the three-dimensional objects detected and the section line, and the step of validating the moving locus validates the moving locus of the preceding vehicle in response to determining that the moving locus of the preceding vehicle is along the three-dimensional object or determining that the moving locus of the preceding vehicle is along the section line when determining that the moving locus of the preceding vehicle is not along the three-dimensional object.

5. A vehicle cruise control apparatus for controlling traveling of an own vehicle based on a predicted route which is a future travel route of the own vehicle, deciding a control target for maintaining distance from preceding vehicles traveling in front of the own vehicle, and controlling the own vehicle according to the decided control target, the vehicle cruise control apparatus comprising:

a memory;

a processor communicable to the memory; and a set of computer-executable instructions stored on the memory that cause the processor to implement:

detecting a position of a stationary object provided on a road or along the road on a side of the road on which the own vehicle travels;

storing on the memory, in a time series, a preceding vehicle position which is a position of a preceding vehicle traveling in front of the own vehicle;

comparing a moving locus of the preceding vehicle which is a trajectory of the preceding vehicle position stored on the memory with the position of the stationary object detected, and determining whether or not the moving locus of the preceding vehicle is along a shape of the road; and validating the moving locus of the preceding vehicle based on determining that the moving locus of the preceding vehicle is along the shape of the road, invalidating the moving locus of the preceding vehicle based on determining that the moving locus is not along the shape of the road, and calculating the predicted route to perform the control of the own vehicle for the control target decided from the preceding vehicles based on the validated moving locus of the preceding vehicle, wherein detecting the position of the stationary object includes detecting one or more three-dimensional objects provided on the road or alongside the road as the stationary object, and detecting a section line on the road, comparing the moving locus with the position of the stationary object includes determining whether or not the moving locus of the preceding vehicle is along at least one of the three-dimensional objects and the section line, and validating the moving locus of the preceding vehicle in response to determining that the moving locus of the preceding vehicle is along the three-dimensional object or determining that the moving locus of the preceding vehicle is along the section line when determining that the moving locus of the preceding vehicle is not along the three-dimensional object.

* * * * *